April 23, 1935. L. G. MODLIN 1,998,841
FOOD FREEZING ATTACHMENT FOR MECHANICAL REFRIGERATORS
Filed Nov. 8, 1933 3 Sheets-Sheet 1

INVENTOR.
L. G. Modlin
BY
his ATTORNEYS.

April 23, 1935. L. G. MODLIN 1,998,841
FOOD FREEZING ATTACHMENT FOR MECHANICAL REFRIGERATORS
Filed Nov. 8, 1933  3 Sheets-Sheet 2
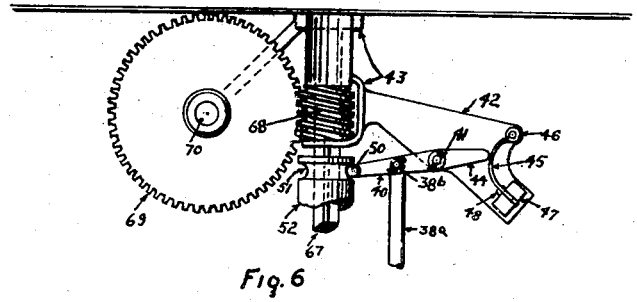
Fig. 6
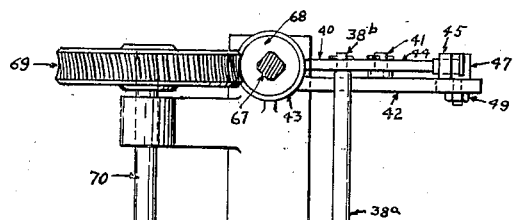
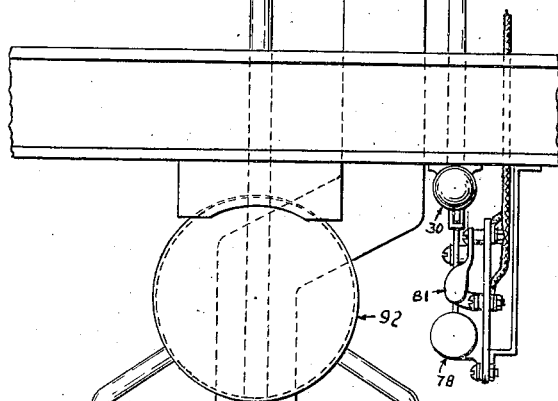
Fig. 5
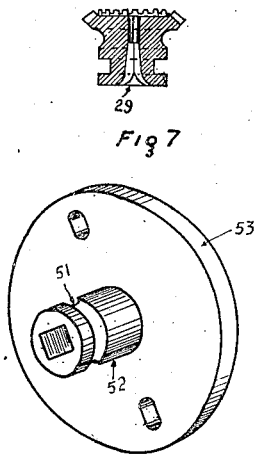
Fig. 7
Fig. 8
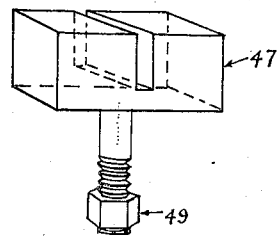
Fig. 9
INVENTOR.
L. G. Modlin
BY
ATTORNEYS.

April 23, 1935.  L. G. MODLIN  1,998,841

FOOD FREEZING ATTACHMENT FOR MECHANICAL REFRIGERATORS

Filed Nov. 8, 1933  3 Sheets—Sheet 3

Inventor
L. G. Modlin
By
his Attorney

Patented Apr. 23, 1935

1,998,841

UNITED STATES PATENT OFFICE 1,998,841

FOOD FREEZING ATTACHMENT FOR MECHANICAL REFRIGERATORS

Lowell G. Modlin, Huntington, W. Va., assignor of twenty-five per cent to S. J. Hyman, twelve and one-half per cent to C. M. Farrington, six and one-fourth per cent to Therne V. Smith, and six and one-fourth per cent to A. L. Barnett Application November 8, 1933, Serial No. 697,100

8 Claims. (Cl. 62—114)

This invention relates to improvements in food freezing attachments for mechanical refrigerators.

The important objects of the present invention are: to provide a food freezing attachment which may be readily inserted into and removed from the refrigerator; a simple and efficient gearing and coupling between the attachment and the motor of the refrigerator; and fool-proof control means for said coupling and the motor circuits.

I attain these and other objects by mechanism illustrated in the accompanying drawings, in which:

Fig. 5 is a front elevation of the entire apparatus;

Fig. 6 is a horizontal plan view of the worm and worm gear with elements of the manual operating means;

Fig. 7 is a section of the bevel gear element that revolves the mixing or dasher element;

Fig. 8 is a perspective view of the outer side of the slidable clutch disc;

Fig. 9 is a perspective view of the spring guide (enlarged);

Similar characters refer to similar parts throughout the several views.

Figure 11:
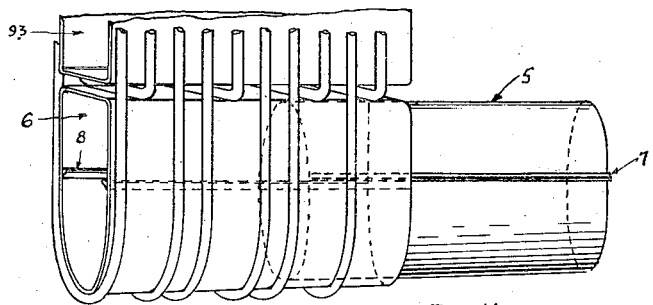
Fig. 11 is a perspective view of the removable container.
Figure 12:
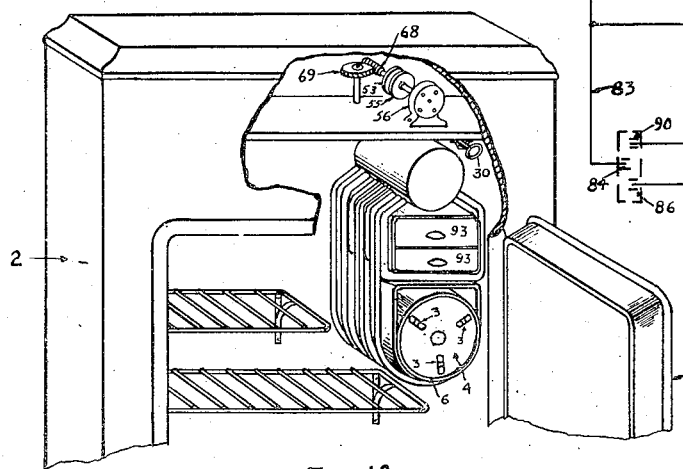
Fig. 12 is a perspective view of the refrigerator equipped with the apparatus.

When it is desired to make ice cream, frozen desserts or the like, the door 1 (Fig. 12) of refrigerator 2 is swung open, the feet 3 projecting from an end wall 4 of container 5 are grasped and the container is withdrawn from the freezing compartment 6. The sliding of container 5 in and out of compartment 6 is facilitated by rails or ribs 7 projecting from the container and engaging guides 8 projecting from the walls of compartment 6 (Figs. 5 and 11). The container is now stood up on feet 3 and lid 9 unscrewed (Fig. 1) from its screw-threaded engagement at 10 with the open end of the container by grasping projections like 24 on the lid. The dasher 11 is placed in the container with the recessed end 12 of its shaft resting on a bearing surface constituted by retaining collar 13 formed in container wall 4. The dasher paddles 14 are hinged at 15 to arms of the dasher shaft 11.

After the container has been filled the lid 9 is again screwed into place with the tapered squared end 16 of the dasher shaft 11 projecting through an opening in the center of the lid. Leakage is prevented owing to the provision of a packing gland 17, packing 18, and packing nut 19. The container 5 is now slid into the compartment 6. The squared end 16 of the dasher shaft projects within a squared opening of a bevel gear 20. The limit of the inward longitudinal movement of the container is determined by stops 21 and 23 formed in the mounting plate 22 of the bevel gear 20. Mounting plate 22 is carried by a bracket 25 fastened to a wall of the refrigerator. The stop 23 has an inwardly curved projection which engages retaining lug 24 formed in the lid 9 to prevent rotation of the container. The container is held against outward longitudinal movement by a spring clip 26 engaging wall 4 of the container and fastened to chamber 6. In order to facilitate insertion of the end 16 of the dasher shaft within the squared perforation 27 in the backing boss 28 of bevel gear 20, the opening of the perforation has an enlarged curved surface as indicated at 29 in Fig. 7.

An operating handle or knob 30 (Figs. 1, 5 and 12) projecting from the front wall of the refrigerator is now pulled out, longitudinally displacing a rod 31. The rod 31 is supported by brackets 32 attached to the insulating base 33 of the refrigerator. A sleeve 34 is fastened to the end of rod 31 and is moved with the latter against the tension of spring 36. The sleeve 34 is slotted at 35 and a pin 37 on the end of shaft 38 travels within said slot.

Figures 1, 2, 3, 4:
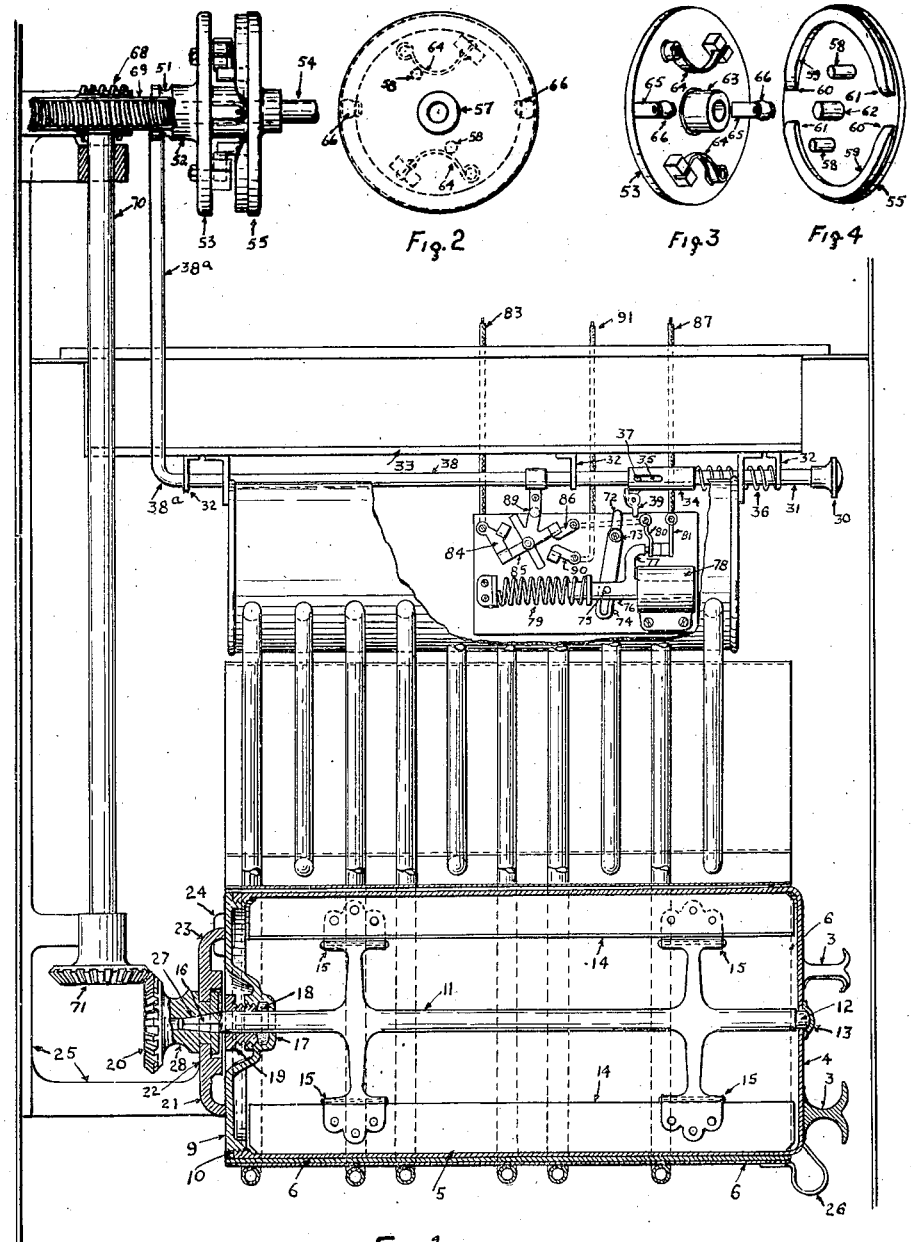
Fig. 1 is a side elevation, partly sectional, of the entire apparatus.
Fig. 2 is a composite view of the two discs comprising the automatic clutch showing a plan of the interlocking of the various elements.
Fig. 3 is a perspective view of the slidable clutch-disc.
Fig. 4 is a perspective view of the fixed clutch-disc.
Figure 10:
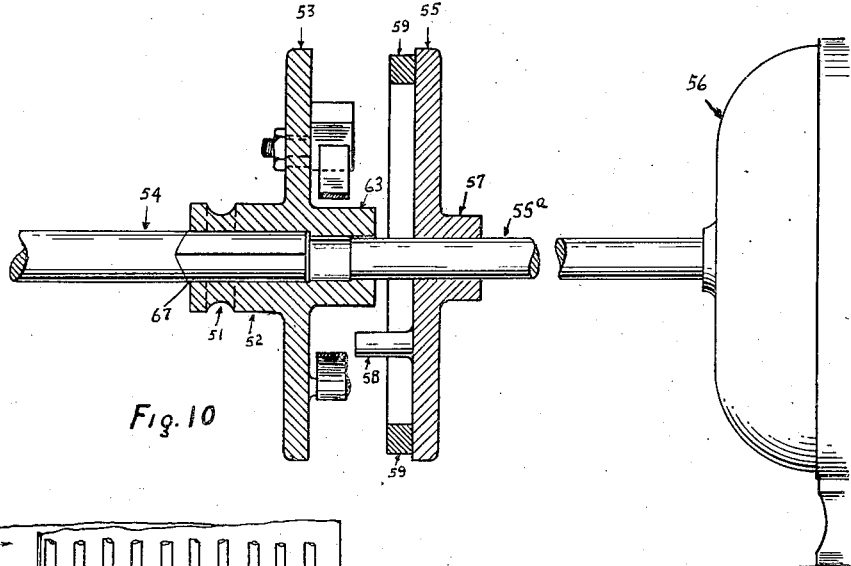
Fig. 10 is a sectional view of the clutch.

Owing to the provisions of this follow-up coupling constituted by the slotted sleeve between the rods 31 and 38, the former is first moved forward a certain distance, displacing a hinged trigger 39 before the sleeve 34 draws, by means of the pin 37, rod 38 in a longitudinal direction. The rod 38 is also supported in brackets 32 of the insulating base 33. The rod 38 is bent at right angles as indicated at 38ᵃ (Figs. 1, 5 and 6). The end of 38ᵃ is pivotally connected at 38ᵇ (Figs. 5 and 6) to arm 40 of a lever pivoted at 41 to a plate 42 which is supported by a bracket 43. The other arm 44 of said lever engages a flat retaining spring 45, the coiled end of which is pivotally attached to plate 42 at 46, and the other end is adjustably held within a slotted hole 48 in a spring guide 47, also mounted on the plate 42, the adjustment of said spring being controlled by means of an adjusting nut 49. The details of this type of guide are best shown in Fig. 9. The free end of arm 40 of the pivoted lever carries a ball roller 50 operatively engaging a groove 51 of a boss 52 of a slidable clutch disc 53 (Figs. 1, 6 and 10).

The movement of the rod 38ª in response to the pulling of the knob 30 will therefore result in sliding the clutch 53 on shaft 54 into engagement with the clutch disc 55. As best shown in Figs. 1 to 4 and 10, the shaft 54 is driven by an electric motor 56 of the mechanical refrigerator. The clutch disc 55 is centrally fixed to motor shaft 55ª by means of a boss 57. On its operating face the fixed disc 55 is provided with two projections or triggers 58 and two annular cams 59 having long inclines 60 and short inclines 61 (see Fig. 4), with low intervening planes. An arbor 62 also projects from disc 55, entering an aligning boss 63 in the slidable clutch disc 53. Two flat curved springs 64 are mounted on the operating face of clutch disc 53 in substantially the same manner as spring 45 is mounted on plate 42. The clutch disc 53 carries also, by means of trunnions 65, rollers 66 which are adapted to roll along the cams 59 of the fixed clutch disc 55. The movement of clutch disc 53 as above described will bring the rollers 66 into engagement with the low planes of cams 59, i. e., with the face of disc 55, and when said cams have been rotated by the motor 56 into a certain position, the springs 64 on the slidable clutch disc 53, will be engaged by the triggers 58 of disc 55, imparting a rotary motion to the clutch disc 53. Since the grooved boss 52 of the slidable disc 53 is mounted on the squared end of shaft 67 (Figs. 5, 6 and 10), the latter will be rotated with a worm 68 attached thereto. The worm causes the rotation of an intermeshing worm gear 69 mounted on the end of a vertical power shaft 70 which is rotatably mounted on suitable brackets attached to the casing of the refrigerator. The lower end of the shaft 70 terminates in a beveled gear 71 which meshes with the beveled gear 20. The rotation of the shaft 70 causes through the beveled gear 71 and 20 the rotation of the dasher 11 within the container 5.

The circuit of the driving motor is closed upon the initial operation of the knob 30 and the forward movement of the hinged trigger 39. This trigger during its forward movement engages one arm 72 of a lever pivoted at 73. The slotted other arm 74 of said lever engages a pin 75 projecting from a piston 76. The piston 76 carries an actuating arm 77, the tip of which is insulated. When the air in a cylinder 78 within which the piston 76 operates is exhausted, a coiled spring 79 will force the piston to the right (as seen in Fig. 1), causing arm 77 to move a contact 80 into engagement with a contact 81. This dashpot arrangement delays the closing of the motor circuit sufficiently to allow proper actuation of the clutch. As will be apparent from Figs. 1 and 13, the circuit of the motor 56 is now closed from the feeder lines 82 through the motor 56, conductor 83, contact terminal 84, movable switch blade 85, terminal 86, contacts 80 and 81, conductor 87 and back to the feeder lines 82.

When the operating knob 30 is released after having been pulled forward, the spring 36 will force back sleeve 34 together with rod 31. However, during the initial forward movement of the sleeve 34, when the latter after a slight delay displaced the rod 38, the auxiliary switch blades 85 were rotated in a clockwise direction (Fig. 1) owing to the connection between said blades and rod 38 by means of linkage 89. In this position of blade 85 conductor 83 is connected through the upper contact of terminal 84 with terminal 90, conductor 91, thermostatic switch 88 and thence to the feeder line 82. This constitutes the operating circuit of the motor through the thermostatic switch, the parallel or branch path through contacts 80 and 81 being provided to close the circuit irrespective of the condition of the thermostatic switch.

The gas tank of the refrigerator 92 (Fig. 5) with which the usual refrigerant circulating pipes are connected, surround the ice cube trays 93 and the freezing compartment 6.

When the cream or other food becomes partially frozen it offers sufficient resistance to the rotation of the dasher blades 14 to overcome the pressure of spring 64 on the slidable clutch disc 53, permitting it to revolve faster than clutch disc 55. The rollers 66 will move up the long inclines 60 of cams 59 on clutch disc 55, forcing the slidable clutch disc away from the fixed clutch disc and breaking thus the driving connection between power shaft 70 and motor shaft 54. The grooved box 52 on the slidable clutch will move the rod 38 into its normal position, allowing the sleeve 34 and connected rod 31 to move into the normal position under the action of the spring 36. This will carry the trigger 39 past the pivoted lever arm 72 (Fig. 1) and will also move the auxiliary switch blade 85 into its normal position in which the conductor 83 is connected through the upper contact of terminal 84 with the terminal 90 and thence through conductor 91 to the thermostatic switch 88. The contacts 80—81 being open, the motor 56 is controlled solely by the thermostatic switch.

Figure 13:
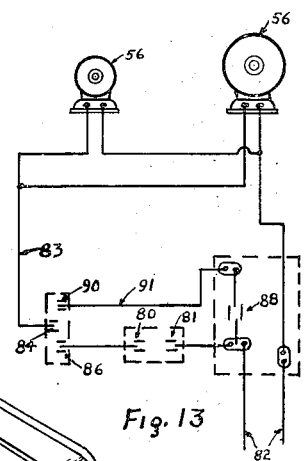
Fig. 13 is a diagram of the plan of electrical wiring.

As shown in Fig. 13, the invention is applicable to mechanical refrigerators in which separate fan and compressor motors are used. When not in use, the container 5 may be removed and the chamber 6 may be used for freezing ice cubes or foods which do not require agitation.

While I have described and shown one specific form of my invention, it will be obvious to those skilled in the art that it may be modified without affecting the scope thereof.

What I claim is:

1. A food freezing attachment for motor operated mechanical refrigerator, comprising a container open at one end, projections on the side walls of said container, a lid cooperating with the open end of said container and having a central perforation, a dasher having a shaft within said container, one end of said shaft projecting through the opening in said lid, a casing surrounded by refrigerant conduits, guides within said casing cooperating with said projections on said container, means for limiting longitudinal and rotary movements of said container within said casing, a power shaft rotatably mounted on said refrigerator for rotating said dasher shaft, a shaft for the refrigerator motor, means including a clutch for coupling said motor shaft with said power shaft, a rod for actuating said clutch, a second rod terminating in an operating handle, a loose follow-up coupling between said rod and said second rod, and a circuit for operating said motor controlled by said follow-up coupling and said first mentioned rod.

2. A food freezing attachment for motor operated mechanical refrigerator, comprising a cylindrical container open at one end, longitudinal rails projecting from the side walls of said container, a lid cooperating with the open end of said container and having a central perforation, a dasher having a shaft within said container, a bearing for one end of said shaft in the closed end of said container, the other end of said shaft projecting through the opening in said lid, a casing surrounded by said refrigerant conduits, guides within said casing cooperating with said rails on said container, stops within said refrigerator adjacent to said casing for limiting in one direction longitudinal movement of said container within said casing, a projection on said lid cooperating with one of said stops to prevent rotation of said container within said casing, a spring attached to said casing and limiting the longitudinal displacement of said container in the opposite direction, a beveled gear having a bore with which the projecting end of said dasher shaft cooperates, a vertical shaft rotatably mounted on said refrigerator, a beveled gear on one end of said shaft engaging the first mentioned beveled gear, a worm gear mounted on the other end of said vertical shaft, a worm engaging said worm gear, a shaft for the refrigerator motor, means including a clutch for coupling said motor shaft with said worm gear, a rod for actuating said clutch, a second rod terminating in an operating handle, a loose follow-up coupling between said rod and said second rod, and a circuit for operating said motor controlled by said follow-up coupling and said first mentioned rod.

3. A food freezing attachment for motor operated mechanical refrigerators, comprising a cylindrical container open at one end, legs projecting from the other end and longitudinal rails projecting from the side walls of said container, a screw-threaded lid cooperating with the open end of said container and having a central perforation, a dasher having a shaft and hinged dasher blades within said container, a bearing for one end of said shaft in the closed end of said container, the other end of said shaft being tapered and substantially rectangular in cross section projecting through the opening in said lid, a packing between the lid opening and said shaft, a casing surrounded by refrigerant conduits, guides within said casing cooperating with said rails on said container, stops within the refrigerator adjacent to said casing for limiting in one direction longitudinal movement of said container within said casing, a projection on said lid cooperating with one of said stops to prevent rotation of said container within said casing, a spring attached to said casing for limiting the longitudinal displacement of said container in the opposite direction, a beveled gear having a tapering squared bore with which the projecting tapered end of said dasher shaft cooperates, a vertical shaft rotatably mounted on said refrigerator, a beveled gear on one end of said shaft engaging the first mentioned beveled gear, a worm gear mounted on the other end of said vertical shaft, a worm engaging said worm gear, a shaft for the refrigerator motor, means including a slidable clutch for coupling said motor shaft with said worm gear, a lever for actuating said clutch, a rod for actuating said lever, a second rod terminating in an operating handle, a loose follow-up coupling between said rod and said second rod, a circuit including a thermostatic switch for operating said motor, a branch path for said circuit excluding said switch, contacts in said branch path controlled by said follow-up coupling, and contacts in said circuit controlled by said first mentioned rod.

4. In a mechanical refrigerator, an electric compressor motor for said refrigerator, a circuit for said motor including a thermostatic switch, a food freezing device containing a dasher in said refrigerator, a handle operable at will for coupling said dasher with said electric motor, a branch path for operating said motor irrespective of the position of said thermostatic switch, contacts in said branch path closed upon the initial operation of said handle, other contacts in the circuit and in said parallel path controlled in the normal and the completed operating position of said handle, and means responsive to the hardness of the food within said food freezer for returning said handle to its normal position.

5. In a mechanical refrigerator, an electric compressor motor for said refrigerator, a circuit for said motor including a thermostatic switch, a food freezing device containing a dasher in said refrigerator, a handle operable at will for coupling said dasher with said electric motor, a branch circuit path for operating said motor irrespective of the position of said thermostatic switch contacts in said branch path, means responsive to the initial operation of said handle, a time delay switch for controlling said contacts, an auxiliary switch having contacts in said circuit and in said branch path and a contact blade for said auxiliary switch closing the contacts in said circuit in the normal position of said switch and the contacts in the branch path in the actuated position, means operable upon the completed operation of said handle for moving said contact blade into its actuated position, resilient means tending to return said handle to normal, and means responsive to the hardness of the food within the food freezer for returning said blade to its normal position.

6. A food freezing attachment for motor operated mechanical refrigerators, comprising a container for the food to be frozen, a dasher in said container, a power shaft for operating said dasher, a motor shaft, a slidable clutch disc connected with said power shaft and rotatable therewith, a clutch disc fixed to said motor shaft, two peripheral cams and two fingers on the fixed clutch disc, two rollers and two arcuate leaf springs on the slidable clutch disc, and means including a handle for moving the slidable clutch disc into position where said springs engage said fingers and said rollers contact with the face of the fixed clutch disc between said cams.

7. A food freezing attachment for motor operated mechanical refrigerators, comprising a container for the food to be frozen, a dasher in said container, a power shaft for operating said dasher, a motor shaft, a slidable clutch disc connected with said power shaft and rotatable therewith, a clutch disc fixed to said motor shaft, two peripheral cams and two fingers on the fixed clutch disc, two rollers and two arcuate leaf springs on the slidable clutch disc, means including a handle for moving the slidable clutch disc into position where said springs engage said fingers and said rollers contact with the face of the fixed clutch disc between said cams, and a circuit for said motor controlled by said handle.

8. A food freezing attachment for motor operated mechanical refrigerators, comprising a container for the food to be frozen, a dasher in said container, a power shaft for operating said dasher, a motor shaft, a slidable clutch disc connected with said power shaft and rotatable therewith, a clutch disc fixed to said motor shaft, two peripheral cams and two fingers on the fixed clutch disc, two rollers and two arcuate leaf springs on the slidable clutch disc, means including a handle for moving the slidable clutch disc into position where said springs engage said fingers and said rollers contact with the face of the fixed clutch disc between said cams, and a circuit for said motor controlled by said handle and said movable clutch disc.

LOWELL G. MODLIN.